(12) United States Patent
Son

(10) Patent No.: US 9,897,777 B2
(45) Date of Patent: Feb. 20, 2018

(54) OPTICAL SYSTEM

(71) Applicant: Samsung Electro-Mechanics Co., Ltd., Suwon-Si (KR)

(72) Inventor: Ju Hwa Son, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 37 days.

(21) Appl. No.: 14/641,153

(22) Filed: Mar. 6, 2015

(65) Prior Publication Data

US 2016/0091691 A1    Mar. 31, 2016

(30) Foreign Application Priority Data

Sep. 30, 2014 (KR) .................. 10-2014-0130796

(51) Int. Cl.
*G02B 3/02* (2006.01)
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
CPC ............................... G02B 13/002; G02B 9/62
USPC ....... 359/746, 753, 763, 659, 658, 657, 713, 359/752, 751, 756, 760, 768, 769, 779, 359/780
See application file for complete search history.

(56) References Cited

U.S. PATENT DOCUMENTS

| | | | | |
|---|---|---|---|---|
| 5,796,529 | A * | 8/1998 | Park | G02B 9/62 359/751 |
| 6,924,949 | B2 * | 8/2005 | Harada | G02B 5/1895 359/740 |
| 7,706,087 | B2 * | 4/2010 | Obama | G02B 9/08 359/708 |
| 2012/0154929 | A1 * | 6/2012 | Tsai | G02B 9/60 359/714 |
| 2013/0050848 | A1 | 2/2013 | Lee | |
| 2013/0279023 | A1 * | 10/2013 | Chen | G02B 13/0045 359/714 |
| 2013/0321932 | A1 | 12/2013 | Hsu et al. | |
| 2014/0168794 | A1 | 6/2014 | Tsai et al. | |
| 2015/0022714 | A1 * | 1/2015 | Huang | G02B 13/0045 348/360 |

(Continued)

FOREIGN PATENT DOCUMENTS

KR    10-2013-0024633 A    3/2013

OTHER PUBLICATIONS

Korean Office Action dated Jan. 1, 2016 in counterpart Korean Application No. KR 10-2014-0130796 (11 pages, in Korean, with English translation).

*Primary Examiner* — Stephone B Allen
*Assistant Examiner* — Travis Fissel
(74) *Attorney, Agent, or Firm* — NSIP Law

(57) ABSTRACT

There is provided an optical system including: a first lens having positive refractive power; a second lens having positive refractive power; a third lens having refractive power and having a convex object-side surface; a fourth lens having refractive power; and a fifth lens having refractive power, wherein the first to fifth lenses are sequentially disposed from an object side, whereby spherical aberration and coma aberration may be improved to realize high resolution in images captured thereby and increase an amount of light incident through the lenses to an image sensor.

36 Claims, 25 Drawing Sheets

(56) References Cited

U.S. PATENT DOCUMENTS

2015/0103225 A1* 4/2015 Hsu .................... G02B 13/0045
348/335

* cited by examiner

| FIRST EXEMPLARY EMBODIMENT | RADIUS OF CURVATURE | THICKNESS OR DISTANCE | REFRACTIVE INDEX | ABBE NUMBER | EFFECTIVE RADIUS | f |
|---|---|---|---|---|---|---|
| S1 | 1.22681 | 0.372 | 1.546 | 56.1 | 0.785 | 8.572 |
| S2 | 1.48414 | 0.2 | | | 0.724 | |
| S3 | 1.83555 | 0.441 | 1.546 | 56.1 | 0.712 | 2.861 |
| S4 | -9.6439 | 0.04 | | | 0.8 | |
| S5 | 7.58194 | 0.22 | 1.658 | 21.5 | 0.788 | -7.304 |
| S6 | 2.9075 | 0.516 | | | 0.871 | |
| S7 | -4.2791 | 0.919 | 1.658 | 21.5 | 0.974 | -8.085 |
| S8 | -23.733 | 0.04 | | | 1.668 | |
| S9 | 2.112 | 0.6 | 1.537 | 55.7 | 1.986 | -17.885 |
| S10 | 1.55932 | 0.222 | | | 2.351 | |
| S11 | | 0.11 | 1.522 | 59.9 | 2.619 | |
| S12 | | 0.52 | | | 2.655 | |
| Image | | 0 | | | 2.934 | |

FIG. 4

| surface# | S1 | S2 | S3 | S4 | S5 | S6 | S7 | S8 | S9 | S10 |
|---|---|---|---|---|---|---|---|---|---|---|
| Conic Constant (K) | -6.57E-01 | -8.29E-01 | 2.10E+00 | -5.00E+00 | -1.00E+01 | -2.07E+00 | -2.58E+00 | -5.00E+01 | -2.08E+01 | -5.11E+00 |
| 4th Order Coefficient (A) | 1.74E-02 | 2.02E-02 | -6.50E-02 | -1.46E-01 | -2.35E-02 | 1.37E-01 | 5.15E-03 | -2.16E-01 | -2.78E-01 | -1.28E-01 |
| 6th Order Coefficient (B) | -1.66E-02 | -4.24E-03 | -5.46E-03 | -1.27E-02 | -3.70E-02 | -9.61E-02 | -3.65E-01 | 3.20E-01 | 1.86E-01 | 5.23E-02 |
| 8th Order Coefficient (C) | -2.87E-02 | -4.12E-01 | -5.05E-01 | 7.31E-01 | 6.26E-03 | 8.70E-02 | 1.20E+00 | -3.34E-01 | -8.33E-02 | -1.48E-02 |
| 10th Order Coefficient (D) | 7.65E-02 | 2.08E+00 | 2.73E+00 | -3.52E+00 | 5.92E-01 | 1.50E-01 | -3.32E+00 | 2.11E-01 | 2.71E-02 | 2.15E-03 |
| 12th Order Coefficient (E) | -3.38E-01 | -5.84E+00 | -7.33E+00 | 1.03E+01 | -1.69E+00 | -2.37E-01 | 5.22E+00 | -8.03E-02 | -5.67E-03 | -3.03E-05 |
| 14th Order Coefficient (F) | 4.06E-01 | 8.01E+00 | 1.02E+01 | -1.53E+01 | 1.65E+00 | -2.26E-01 | -4.39E+00 | 1.69E-02 | 6.55E-04 | -2.70E-05 |
| 16th Order Coefficient (G) | -2.00E-01 | -4.20E+00 | -5.33E+00 | 9.12E+00 | -9.61E-01 | 2.56E-01 | 1.49E+00 | -1.48E-03 | -3.14E-05 | 2.14E-06 |

FIG. 5

| SECOND EXEMPLARY EMBODIMENT | RADIUS OF CURVATURE | THICKNESS OR DISTANCE | REFRACTIVE INDEX | ABBE NUMBER | EFFECTIVE RADIUS | f |
|---|---|---|---|---|---|---|
| S1 | 1.27855 | 0.317 | 1.546 | 56.1 | 0.714 | 8.174 |
| S2 | 1.63437 | 0.177 | | | 0.679 | |
| S3 | 2.86568 | 0.424 | 1.546 | 56.1 | 0.67 | 3.064 |
| S4 | -3.81901 | 0.04 | | | 0.749 | |
| S5 | 2.91897 | 0.22 | 1.658 | 21.5 | 0.806 | -7.865 |
| S6 | 1.81052 | 0.544 | | | 0.914 | |
| S7 | -3.65742 | 0.721 | 1.658 | 21.5 | 0.997 | -12.09 |
| S8 | -7.29988 | 0.04 | | | 1.554 | |
| S9 | 1.30438 | 0.535 | 1.537 | 55.7 | 2.02 | -40.337 |
| S10 | 1.05394 | 0.311 | | | 2.337 | |
| S11 | | 0.11 | 1.522 | 59.9 | 2.634 | |
| S12 | | 0.505 | | | 2.668 | |
| Image | | 0.005 | | | 2.934 | |

FIG. 9

| surface# | S1 | S2 | S3 | S4 | S5 | S6 | S7 | S8 | S9 | S10 |
|---|---|---|---|---|---|---|---|---|---|---|
| Conic Constant (K) | -1.19E+00 | -2.05E+00 | 7.96E-01 | -3.73E-01 | 9.38E-01 | -6.89E+00 | 3.18E+00 | -3.43E+00 | -8.04E+00 | -3.97E+00 |
| 4th Order Coefficient (A) | -3.61E-04 | -1.28E-02 | -9.28E-02 | -4.63E-01 | -4.42E-01 | 5.64E-02 | 1.51E-01 | -1.65E-01 | -2.72E-01 | -1.60E-01 |
| 6th Order Coefficient (B) | 1.02E-01 | -1.09E-01 | -7.69E-02 | 1.63E+00 | 1.68E+00 | -8.18E-02 | -7.14E-01 | 3.23E-01 | 1.92E-01 | 8.57E-02 |
| 8th Order Coefficient (C) | -1.25E+00 | -7.52E-01 | -4.40E-01 | -4.36E+00 | -5.28E+00 | 5.65E-01 | 1.91E+00 | -3.94E-01 | -9.69E-02 | -3.39E-02 |
| 10th Order Coefficient (D) | 4.38E+00 | 5.20E+00 | 3.71E+00 | 7.71E+00 | 1.39E+01 | -1.20E+00 | -4.05E+00 | 2.65E-01 | 3.26E-02 | 8.41E-03 |
| 12th Order Coefficient (E) | -8.92E+00 | -1.78E+01 | -1.17E+01 | -8.75E+00 | -2.65E+01 | 1.16E+00 | 5.13E+00 | -1.05E-01 | -6.52E-03 | -1.25E-03 |
| 14th Order Coefficient (F) | 8.85E+00 | 2.88E+01 | 1.82E+01 | 5.49E+00 | 2.86E+01 | -6.86E-01 | -3.56E+00 | 2.22E-02 | 6.99E-04 | 9.91E-05 |
| 16th Order Coefficient (G) | -3.34E+00 | -1.70E+01 | -1.06E+01 | -1.40E+00 | -1.33E+01 | 2.20E-01 | 1.00E+00 | -1.91E-03 | -3.10E-05 | -3.14E-06 |

FIG. 10

| THIRD EXEMPLARY EMBODIMENT | RADIUS OF CURVATURE | THICKNESS OR DISTANCE | REFRACTIVE INDEX | ABBE NUMBER | EFFECTIVE RADIUS | f |
|---|---|---|---|---|---|---|
| S1 | 1.36893 | 0.375 | 1.546 | 56.1 | 0.95 | 8.093 |
| S2 | 1.79043 | 0.254 | | | 0.792 | |
| Stop | infinity | 0 | | | 0.773 | |
| S4 | 2.22204 | 0.53 | 1.546 | 56.1 | 0.76 | 2.979 |
| S5 | -5.57372 | 0.04 | | | 0.829 | |
| S6 | 7.75112 | 0.221 | 1.646 | 23.3 | 0.855 | -5.341 |
| S7 | 2.36089 | 0.586 | | | 0.971 | |
| S8 | -10.5746 | 0.97 | 1.646 | 23.3 | 1.15 | 63.04 |
| S9 | -8.69711 | 0.053 | | | 1.77 | |
| S10 | 2.63681 | 0.5 | 1.537 | 55.7 | 2.2 | -6.015 |
| S11 | 1.355622 | 0.231 | | | 2.36 | |
| S12 | | 0.11 | 1.522 | 59.9 | 2.632 | |
| S13 | | 0.546 | | | 2.665 | |
| Image | | 0.003484 | | | 2.936086 | |

FIG. 14

| surface# | S1 | S2 | S4 | S5 | S6 | S7 | S8 | S9 | S10 | S11 |
|---|---|---|---|---|---|---|---|---|---|---|
| Conic Constant (K) | -7.15E-01 | -1.87E+00 | 7.37E-01 | 4.36E+00 | -1.13E-01 | -1.31E+00 | 9.01E-02 | 3.07E+00 | -2.15E+01 | -5.22E+00 |
| 4th Order Coefficient (A) | 3.26E-03 | -4.17E-04 | -5.12E-02 | -1.60E-01 | -1.41E-01 | 2.50E-02 | 1.01E-02 | -2.70E-02 | -2.25E-01 | -1.46E-01 |
| 6th Order Coefficient (B) | -1.20E-02 | -4.53E-02 | -4.29E-02 | 1.72E-01 | 2.10E-01 | -3.85E-02 | -1.00E-01 | -1.79E-03 | 5.09E-02 | 7.01E-02 |
| 8th Order Coefficient (C) | -3.04E-02 | -4.34E-02 | -7.37E-02 | -1.45E-01 | -5.60E-01 | 1.72E-01 | 2.28E-02 | -1.79E-03 | 2.37E-02 | -2.59E-02 |
| 10th Order Coefficient (D) | -1.53E-02 | 7.53E-02 | 5.90E-01 | 4.19E-01 | 2.35E+00 | -1.65E-01 | 6.21E-02 | 2.13E-03 | -1.70E-02 | 5.84E-03 |
| 12th Order Coefficient (E) | 6.31E-02 | 8.02E-03 | -1.40E+00 | -9.40E-01 | -5.59E+00 | -4.11E-02 | -1.00E-01 | -1.51E-03 | 4.40E-03 | -6.43E-04 |
| 14th Order Coefficient (F) | -8.04E-02 | 0 | 1.96E+00 | 1.00E+00 | 6.25E+00 | 5.99E-02 | 3.78E-02 | 3.16E-04 | -5.39E-04 | 1.64E-05 |
| 16th Order Coefficient (G) | 3.34E-02 | 0 | -1.03E+00 | -3.90E-01 | -2.87E+00 | 0.00E+00 | 0 | -8.80E-06 | 2.60E-05 | 1.39E-06 |

FIG. 15

| FOURTH EXEMPLARY EMBODIMENT | RADIUS OF CURVATURE | THICKNESS OR DISTANCE | REFRACTIVE INDEX | ABBE NUMBER | EFFECTIVE RADIUS | f |
|---|---|---|---|---|---|---|
| S1 | 1.30245 | 0.407 | 1.546 | 56.1 | 0.864 | 8.229 |
| S2 | 1.63097 | 0.246 | | | 0.798 | |
| S3 | 1.82394 | 0.449 | 1.546 | 56.1 | 0.773 | 3.262 |
| S4 | -71.691 | 0.04 | | | 0.82 | |
| S5 | 6.05014 | 0.25 | 1.658 | 21.5 | 0.843 | -7.868 |
| S6 | 2.74413 | 0.559 | | | 0.913 | |
| S7 | -3.5892 | 0.911 | 1.658 | 21.5 | 0.981 | -11.018 |
| S8 | -7.82377 | 0.04 | | | 1.643 | |
| S9 | 1.87379 | 0.5 | 1.537 | 55.7 | 2.048 | -17.421 |
| S10 | 1.41545 | 0.261 | | | 2.309 | |
| S11 | | 0.11 | 1.522 | 59.9 | 2.582 | |
| S12 | | 0.648 | | | 2.615 | |
| Image | | -0.001 | | | 2.935 | |

FIG. 19

| surface# | S1 | S2 | S3 | S4 | S5 | S6 | S7 | S8 | S9 | S10 |
|---|---|---|---|---|---|---|---|---|---|---|
| Conic Constant (K) | -6.04E-01 | -9.64E-01 | 1.70E+00 | -7.44E+00 | -2.63E+01 | -1.59E+00 | 3.68E+00 | -3.95E+01 | -1.15E+01 | -4.05E+00 |
| 4th Order Coefficient (A) | 1.08E-02 | -2.36E-03 | -7.57E-02 | -1.95E-01 | -8.40E-02 | 1.04E-01 | 3.31E-02 | -1.88E-01 | -3.11E-01 | -1.92E-01 |
| 6th Order Coefficient (B) | -1.60E-02 | -2.31E-02 | 6.17E-03 | 5.60E-02 | 4.25E-02 | -1.18E-01 | -3.52E-01 | 2.52E-01 | 2.10E-01 | 1.04E-01 |
| 8th Order Coefficient (C) | 1.25E-02 | -2.31E-02 | -5.26E-01 | 3.87E-01 | 3.41E-02 | 4.21E-01 | 9.22E-01 | -2.62E-01 | -9.08E-02 | -3.97E-02 |
| 10th Order Coefficient (D) | -1.15E-02 | -1.53E-02 | 2.16E+00 | -1.28E+00 | 5.72E-01 | -9.61E-01 | -2.23E+00 | 1.71E-01 | 2.75E-02 | 9.49E-03 |
| 12th Order Coefficient (E) | -6.92E-02 | 2.31E-02 | -4.79E+00 | 3.17E+00 | -1.59E+00 | 1.57E+00 | 3.21E+00 | -6.86E-02 | -5.33E-03 | -1.32E-03 |
| 14th Order Coefficient (F) | 7.37E-02 | 2.31E-02 | 5.63E+00 | -4.28E+00 | 1.70E+00 | -1.51E+00 | -2.55E+00 | 1.51E-02 | 5.74E-04 | 9.54E-05 |
| 16th Order Coefficient (G) | -2.36E-02 | 2.31E-02 | -2.42E+00 | 2.57E+00 | -8.01E-01 | 5.61E-01 | 8.06E-01 | -1.39E-03 | -2.60E-05 | -2.70E-06 |

FIG. 20

| FIFTH EXEMPLARY EMBODIMENT | RADIUS OF CURVATURE | THICKNESS OR DISTANCE | REFRACTIVE INDEX | ABBE NUMBER | EFFECTIVE RADIUS | f |
|---|---|---|---|---|---|---|
| S1 | 1.36 | 0.393 | 1.546 | 56.1 | 0.843 | 9.202 |
| S2 | 1.67377 | 0.229 | | | 0.789 | |
| S3 | 2.06159 | 0.474 | 1.546 | 56.1 | 0.773 | 3.065 |
| S4 | -8.20414 | 0.04 | | | 0.827 | |
| S5 | 4.04132 | 0.25 | 1.658 | 21.5 | 0.86 | -8.107 |
| S6 | 2.24289 | 0.575 | | | 0.94 | |
| S7 | -3.32613 | 0.968 | 1.658 | 21.5 | 0.989 | -14.463 |
| S8 | -5.70355 | 0.04 | | | 1.709 | |
| S9 | 1.92737 | 0.5 | 1.537 | 55.7 | 2.172 | -10.846 |
| S10 | 1.31671 | 0.291 | | | 2.435 | |
| S11 | | 0.11 | 1.522 | 59.9 | 2.737 | |
| S12 | | 0.55 | | | 2.769 | |
| Image | | 0 | | | 3.034 | |

FIG. 24

| surface# | S1 | S2 | S3 | S4 | S6 | S7 | S8 | S9 | S10 | S11 |
|---|---|---|---|---|---|---|---|---|---|---|
| Conic Constant (K) | -0.70156 | -1.11298 | 0.08101 | 69.2538 | -0.99762 | -0.47927 | -38.9726 | 3.459676 | -10.7812 | -4.70478 |
| 4th Order Coefficient (A) | -0.0059 | -0.01428 | -0.03173 | -0.14323 | -0.15015 | 0.003874 | -0.06691 | -0.1914 | -0.29959 | -0.16516 |
| 6th Order Coefficient (B) | -0.0008 | -0.02592 | 0.004738 | 0.216823 | 0.212177 | 0.004004 | 0.024854 | 0.353873 | 0.2018 | 0.094516 |
| 8th Order Coefficient (C) | -0.05377 | -0.08939 | -0.20564 | -0.37009 | -0.41979 | 0.053264 | -0.20739 | -0.48279 | -0.1008 | -0.03993 |
| 10th Order Coefficient (D) | 0.098859 | 0.295738 | 0.527769 | 0.640807 | 1.125383 | -0.00992 | 0.310241 | 0.408532 | 0.036588 | 0.010792 |
| 12th Order Coefficient (E) | -0.11783 | -0.51803 | -0.79395 | -0.65819 | -1.74803 | -0.02754 | -0.2596 | -0.21246 | -0.00817 | -0.00177 |
| 14th Order Coefficient (F) | 0.067387 | 0.443054 | 0.638111 | 0.336706 | 1.412589 | 0.00534 | 0.073778 | 0.060352 | 0.00098 | 1.60E-04 |
| 16th Order Coefficient (G) | -0.01496 | -0.13975 | -0.18394 | -0.02218 | -0.47346 | 0 | 0 | -0.00706 | -4.83E-05 | -6.08E-06 |

FIG. 25

OPTICAL SYSTEM

CROSS-REFERENCE TO RELATED APPLICATION

This application claims the priority and benefit of Korean Patent Application No. 10-2014-0130796 filed on Sep. 30, 2014, with the Korean Intellectual Property Office, the disclosure of which is incorporated herein by reference.

BACKGROUND

The present disclosure relates to an optical system.

Recently, mobile communications terminals have commonly been provided with camera modules, enabling image capturing and video calling. In addition, as levels of functionality of cameras in such mobile communications terminals have gradually increased, cameras for use in mobile communications terminals have gradually been required to have higher levels of resolution and performance.

However, since there is a trend for mobile communications terminals to be miniaturized and lightened, there are limitations in obtaining camera modules having high levels of resolution and high degrees of performance.

In order to resolve such issues, recently, camera lenses have been formed of plastic, a material lighter than glass, and lens modules have been configured of five or more lenses to achieve high degrees of resolution.

SUMMARY

An aspect of the present disclosure may provide an optical system in which an aberration improvement effect is increased, a high degree of resolution is realized, and sensitivity of lenses is improved.

According to an aspect of the present disclosure, an optical system may include: a first lens having positive refractive power; a second lens having positive refractive power; a third lens having refractive power and having a convex object-side surface; a fourth lens having refractive power; and a fifth lens having refractive power, wherein the first to fifth lenses are sequentially disposed from an object side, whereby spherical aberration and coma aberration may be improved to realize high resolution in images captured thereby and increase an amount of light incident through the lenses to an image sensor.

BRIEF DESCRIPTION OF DRAWINGS

The above and other aspects, features and advantages of the present disclosure will be more clearly understood from the following detailed description taken in conjunction with the accompanying drawings, in which:

FIG. 4 is a table illustrating characteristics of lenses illustrated in FIG. 1;

FIG. 5 is a table illustrating aspherical surface coefficients of the lens module illustrated in FIG. 1;

FIG. 9 is a table illustrating characteristics of lenses illustrated in FIG. 6;

FIG. 10 is a table illustrating aspherical surface coefficients of the lens module illustrated in FIG. 6;

FIG. 14 is a table illustrating characteristics of lenses illustrated in FIG. 11;

FIG. 15 is a table illustrating aspherical surface coefficients of the lens module illustrated in FIG. 11;

FIG. 19 is a table illustrating characteristics of lenses illustrated in FIG. 16;

FIG. 20 is a table illustrating aspherical surface coefficients of the lens module illustrated in FIG. 16;

FIG. 24 is a table illustrating characteristics of lenses illustrated in FIG. 21; and FIG. 25 is a table illustrating aspherical surface coefficients of the lens module illustrated in FIG. 21.

DETAILED DESCRIPTION

Figure 1:
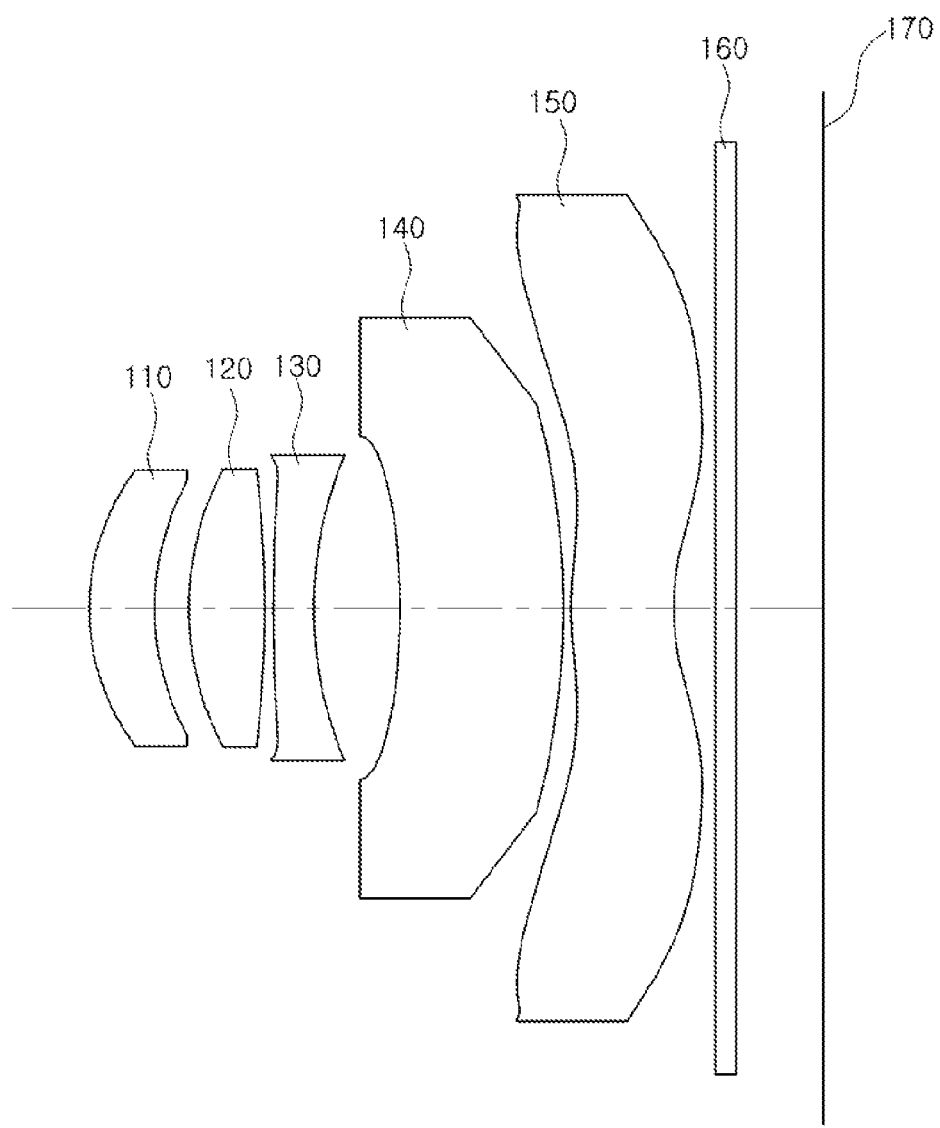
FIG. 1 is a view of an optical system according to a first exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In the drawings, the thicknesses, sizes, and shapes of lenses have been slightly exaggerated for convenience of explanation. Particularly, the shapes of spherical surfaces or aspherical surfaces illustrated in the drawings are illustrated by way of example. That is, the shapes of the spherical surfaces or the aspherical surfaces are not limited to those illustrated in the drawings.

In the present specification, a first lens refers to a lens closest to an object, while a fifth lens refers to a lens closest to an imaging surface.

In addition, a first surface of each lens refers to a surface thereof closest to an object (or an object-side surface) and a second surface of each lens refers to a surface thereof closest to an imaging surface (or an image-side surface). Further, all numerical values of radii of curvature, thicknesses, and the like, of lenses are indicated by millimeters (mm).

An optical system according to exemplary embodiments of the present disclosure may include five lenses.

That is, the optical system may include a first lens, a second lens, a third lens, a fourth lens, and a fifth lens.

However, the optical system is not limited to only including five lenses, but may further include other components, if necessary. For example, the optical system may include a stop controlling an amount of light. In addition, the optical system may further include an infrared cut-off filter filtering infrared light. Further, the optical system may further include an image sensor converting an image of a subject incident thereon into an electrical signal. Further, the optical system may further include a gap maintaining member adjusting a gap between lenses.

In the optical system according to exemplary embodiments, the first to fifth lenses may be formed of plastic.

In addition, at least one of the first to fifth lenses may have an aspherical surface. Alternatively, each of the first to fifth lenses may have at least one aspherical surface.

That is, at least one of first and second surfaces of the first to fifth lenses may be aspherical. Here, the aspherical surfaces of the first to fifth lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + \ldots \quad [\text{Equation 1}]$$

Here, c is a curvature (an inverse of a radius of curvature) at an apex of the lens, K is a conic constant, and Y is a distance from a certain point on the aspherical surface of the lens to an optical axis in a direction perpendicular to the optical axis. In addition, constants A to F are aspherical surface coefficients. In addition, Z is a distance between the certain point on the aspherical surface at the distance Y and a tangential plane meeting the apex of the aspherical surface of the lens.

The optical system including the first to fifth lenses may have lenses having positive refractive power/positive refractive power/negative refractive power/positive or negative refractive power/negative refractive power sequentially from an object side.

The optical system configured as described above may improve optical performance through aberration improvement. In addition, the optical system configured as described above may improve a mass-production yield by enlarging tolerances of the lenses at the time of assembling the lenses.

The optical system according to exemplary embodiments may satisfy Conditional Expression 1.

$43<(ANG*\text{ImgH})/(Fno*TTL)<55$ [Conditional Expression 1]

Here, ANG is a field of view of the optical system, ImgH is a diagonal length of an imaging surface of the image sensor, Fno is a constant indicating brightness of the optical system, and TTL is a distance from an object-side surface of the first lens to the imaging surface of the image sensor.

The optical system according to exemplary embodiments may satisfy Conditional Expression 2.

$0.33<R1/EFL\leq0.39$ [Conditional Expression 2]

Here, R1 is a radius of curvature of the object-side surface of the first lens, and EFL is an overall focal length of the optical system.

The optical system according to exemplary embodiments may satisfy Conditional Expression 3.

$0.42\leq R2/EFL<0.50$ [Conditional Expression 3]

Here, R2 is a radius of curvature of an image-side surface of the first lens, and EFL is the overall focal length of the optical system.

The optical system according to exemplary embodiments may satisfy Conditional Expression 4.

$0.47\leq R3/EFL\leq0.88$ [Conditional Expression 4]

Here, R3 is a radius of curvature of an object-side surface of the second lens, and EFL is the overall focal length of the optical system.

The optical system according to exemplary embodiments may satisfy Conditional Expression 5.

$0.65<TTL/\text{ImgH}\leq0.75$ [Conditional Expression 5]

Here, TTL is the distance from the object-side surface of the first lens to the imaging surface of the image sensor, and ImgH is the diagonal length of the imaging surface of the image sensor.

The optical system according to exemplary embodiments may satisfy Conditional Expression 6.

$Fno\leq2.4$ [Conditional Expression 6]

Here, Fno is the constant indicating the brightness of the optical system.

The optical system according to exemplary embodiments may satisfy Conditional Expression 7.

$Fno\leq2.3$ [Conditional Expression 7]

Here, Fno is the constant indicating the brightness of the optical system.

The optical system according to exemplary embodiments may satisfy Conditional Expression 8.

$ANG/Fno\geq32$ [Conditional Expression 8]

Here, ANG is the field of view of the optical system, and Fno is the constant indicating the brightness of the optical system.

The optical system according to exemplary embodiments may satisfy Conditional Expression 9.

$v4<24$ [Conditional Expression 9]

Here, v4 is an Abbe number of the fourth lens.

The optical system according to exemplary embodiments may satisfy Conditional Expression 10.

$ANG>74°$ [Conditional Expression 10]

Here, ANG is the field of view of the optical system.

The optical system according to exemplary embodiments may satisfy Conditional Expression 11.

$ANG>74.5°$ [Conditional Expression 11]

Here, ANG is the field of view of the optical system.

Next, the first to fifth lenses configuring the optical system according to exemplary embodiments will be described.

The first lens may have positive refractive power. In addition, the first lens may have a meniscus shape of which an object-side surface is convex. In detail, first and second surfaces of the first lens may be convex toward the object.

At least one of the first and second surfaces of the first lens may be aspherical. For example, both surfaces of the first lens may be aspherical.

The second lens may have positive refractive power. In addition, both surfaces of the second lens may be convex.

At least one of first and second surfaces of the second lens may be aspherical. For example, both surfaces of the second lens may be aspherical.

The third lens may have negative refractive power. In addition, the third lens may have a meniscus shape of which an object-side surface is convex. In detail, first and second surfaces of the third lens may be convex toward the object.

At least one of the first and second surfaces of the third lens may be aspherical. For example, both surfaces of the third lens may be aspherical.

The fourth lens may have positive or negative refractive power. In addition, the fourth lens may have a meniscus shape of which an image-side surface is convex. In detail, a first surface of the fourth lens may be concave toward the object, and a second surface thereof may be convex toward the imaging surface.

At least one of the first and second surfaces of the fourth lens may be aspherical. For example, both surfaces of the fourth lens may be aspherical.

The fifth lens may have negative refractive power. In addition, the fifth lens may have a meniscus shape of which an object-side surface is convex. In detail, first and second surfaces of the fifth lens may be convex toward the object.

At least one of the first and second surfaces of the fifth lens may be aspherical. For example, both surfaces of the fifth lens may be aspherical.

In addition, the fifth lens may have at least one inflection point formed on at least one of the first and second surfaces thereof. For example, the second surface of the fifth lens may be concave in a paraxial region and become convex at an edge thereof.

In addition, the fifth lens may have at least four inflection points formed in an effective radius thereof.

In the optical system configured as described above, a plurality of lenses perform an aberration correction function, whereby aberration performance may be improved. For example, the first and second lenses may have the positive refractive power to correct spherical aberration, and an image-side surface of the second lens may be convex to smoothly correct coma aberration.

In addition, in the optical system, the tolerances of the lenses may be enlarged at the time of assembling the lenses to improve sensitivity of the lenses and improve a mass-production yield.

In addition, in the optical system, all of the lenses are formed of plastic, whereby a cost required for manufacturing a lens module may be decreased and manufacturing efficiency of the lens module may be increased.

An optical system according to a first exemplary embodiment of the present disclosure will be described with reference to FIGS. 1 through 5.

The optical system according to the first exemplary embodiment may include a first lens 110, a second lens 120, a third lens 130, a fourth lens 140, and a fifth lens 150, and may further include an infrared cut-off filter 160 and an image sensor 170.

Here, respective characteristics (radii of curvature, thicknesses of lenses or distances between the lenses, refractive indices, Abbe numbers, and effective radii) of lenses are illustrated in FIG. 4.

In the first exemplary embodiment, the first lens 110 may have positive refractive power, and have a meniscus shape of which an object-side surface is convex. The second lens 120 may have positive refractive power and have both surfaces that are convex. The third lens 130 may have negative refractive power and have a meniscus shape of which an object-side surface is convex. The fourth lens 140 may have negative refractive power and have a meniscus shape of which an image-side surface is convex. The fifth lens 150 may have negative refractive power and have a meniscus shape of which an object-side surface is convex. In addition, the fifth lens 150 may have at least one inflection point formed on at least one of first and second surfaces thereof. In addition, the fifth lens 150 may have at least four inflection points in an effective radius thereof.

Meanwhile, respective surfaces of the first to fifth lenses 110 to 150 may have aspherical surface coefficients as illustrated in FIG. 5. That is, all of the first surface of the first lens 110 to the second surface of the fifth lens 150 may be aspherical.

Figure 2:
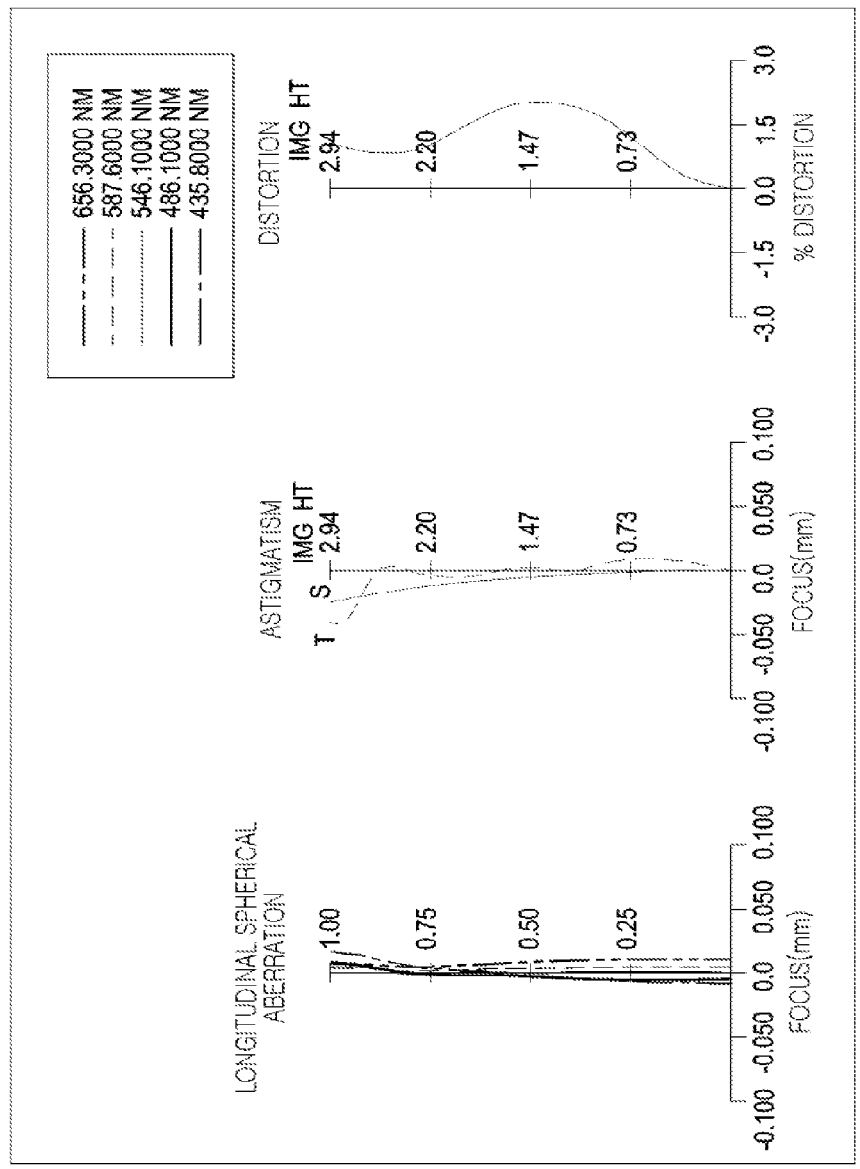
FIGS. 2 and 3 are graphs having curves representing aberration characteristics of the optical system illustrated in FIG. 1.
Figure 3:
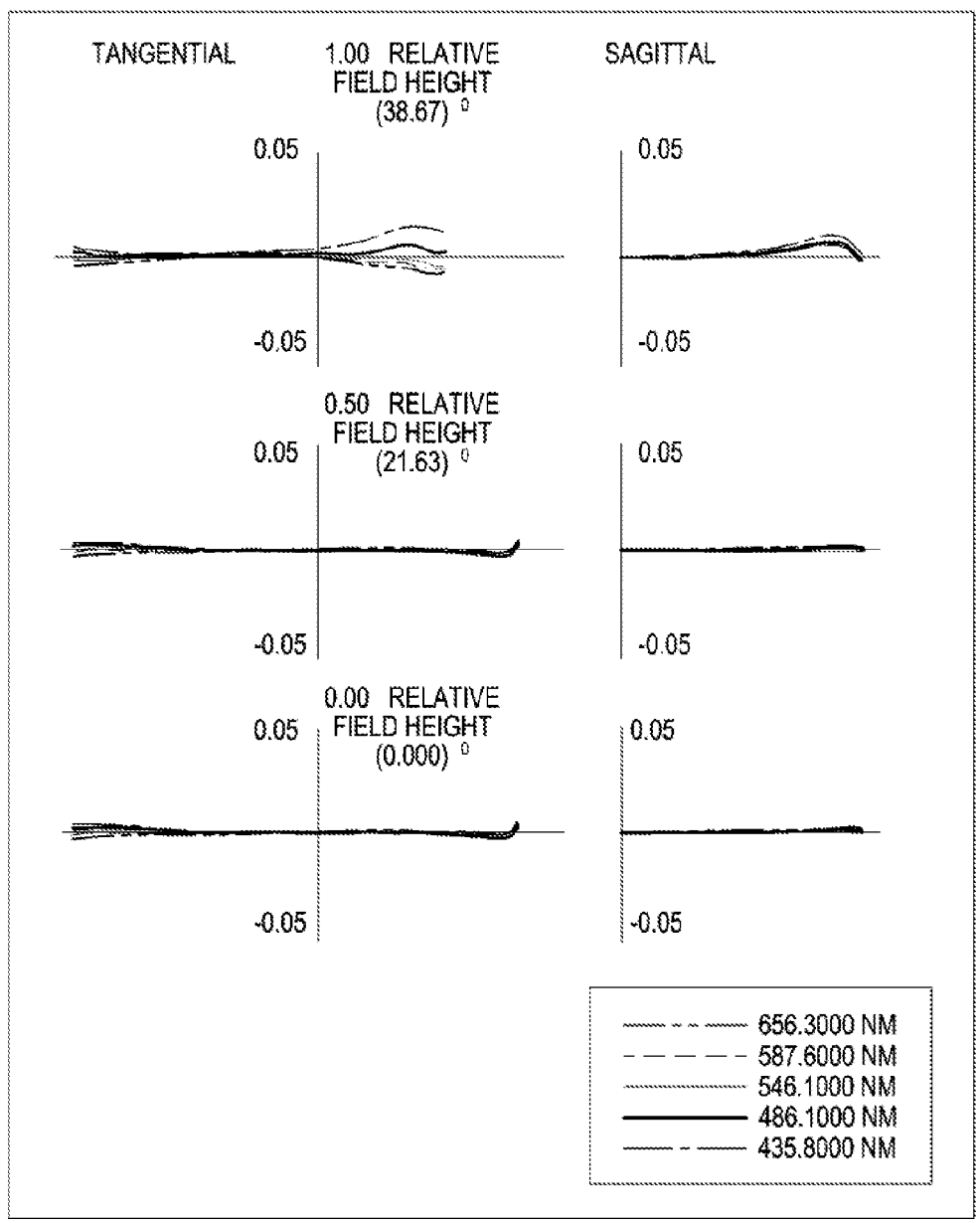
Figure 6:
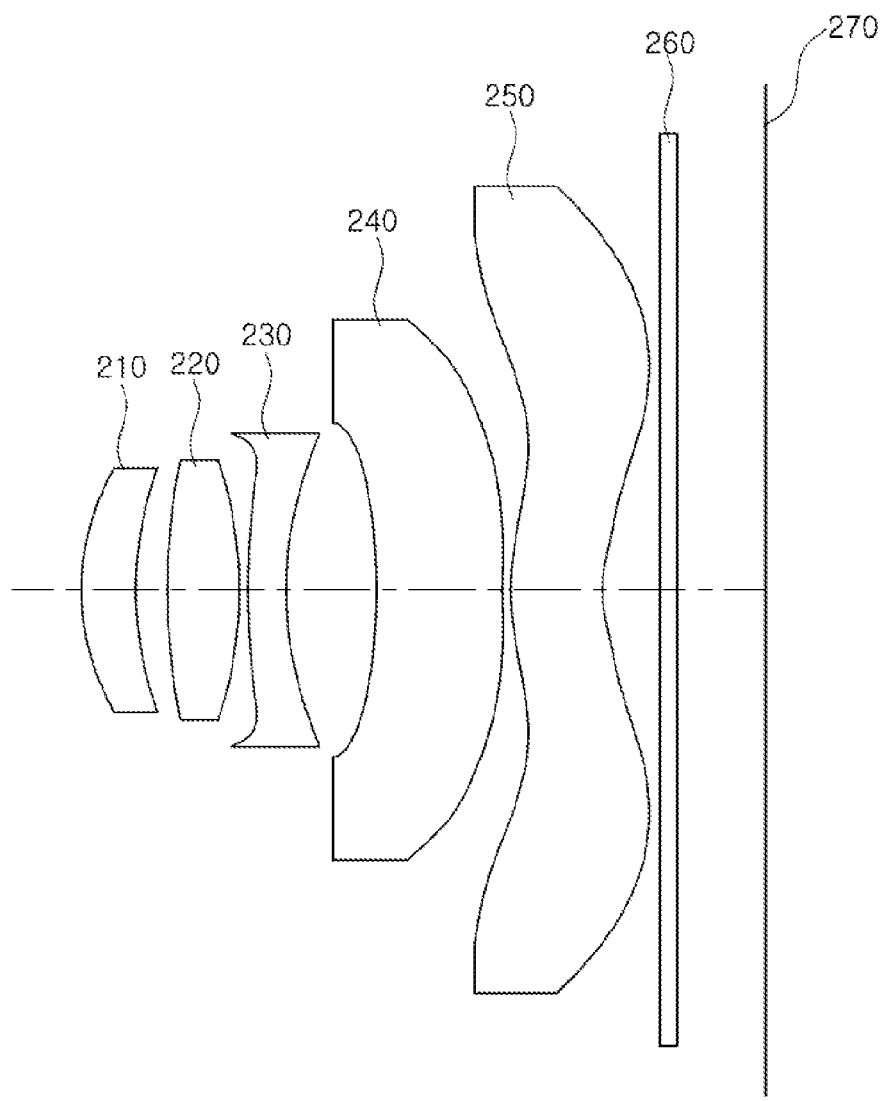
FIG. 6 is a view of an optical system according to a second exemplary embodiment of the present disclosure.

In addition, the optical system configured as described above may have aberration characteristics illustrated in FIGS. 2 and 3.

An optical system according to a second exemplary embodiment of the present disclosure will be described with reference to FIGS. 6 through 10.

The optical system according to the second exemplary embodiment may include a first lens 210, a second lens 220, a third lens 230, a fourth lens 240, and a fifth lens 250, and may further include an infrared cut-off filter 260 and an image sensor 270.

Here, respective characteristics (radii of curvature, thicknesses of lenses or distances between the lenses, refractive indices, Abbe numbers, and effective radii) of lenses are illustrated in FIG. 9.

In the second exemplary embodiment, the first lens 210 may have positive refractive power, and have a meniscus shape of which an object-side surface is convex. The second lens 220 may have positive refractive power and have both surfaces that are convex. The third lens 230 may have negative refractive power and have a meniscus shape of which an object-side surface is convex. The fourth lens 240 may have negative refractive power and have a meniscus shape of which an image-side surface is convex. The fifth lens 250 may have negative refractive power and have a meniscus shape of which an object-side surface is convex. In addition, the fifth lens 250 may have at least one inflection point formed on at least one of first and second surfaces thereof. In addition, the fifth lens 250 may have at least four inflection points in an effective radius thereof.

Meanwhile, respective surfaces of the first to fifth lenses 210 to 250 may have aspherical surface coefficients as illustrated in FIG. 10. That is, all of the first surface of the first lens 210 to the second surface of the fifth lens 250 may be aspherical.

Figure 7:
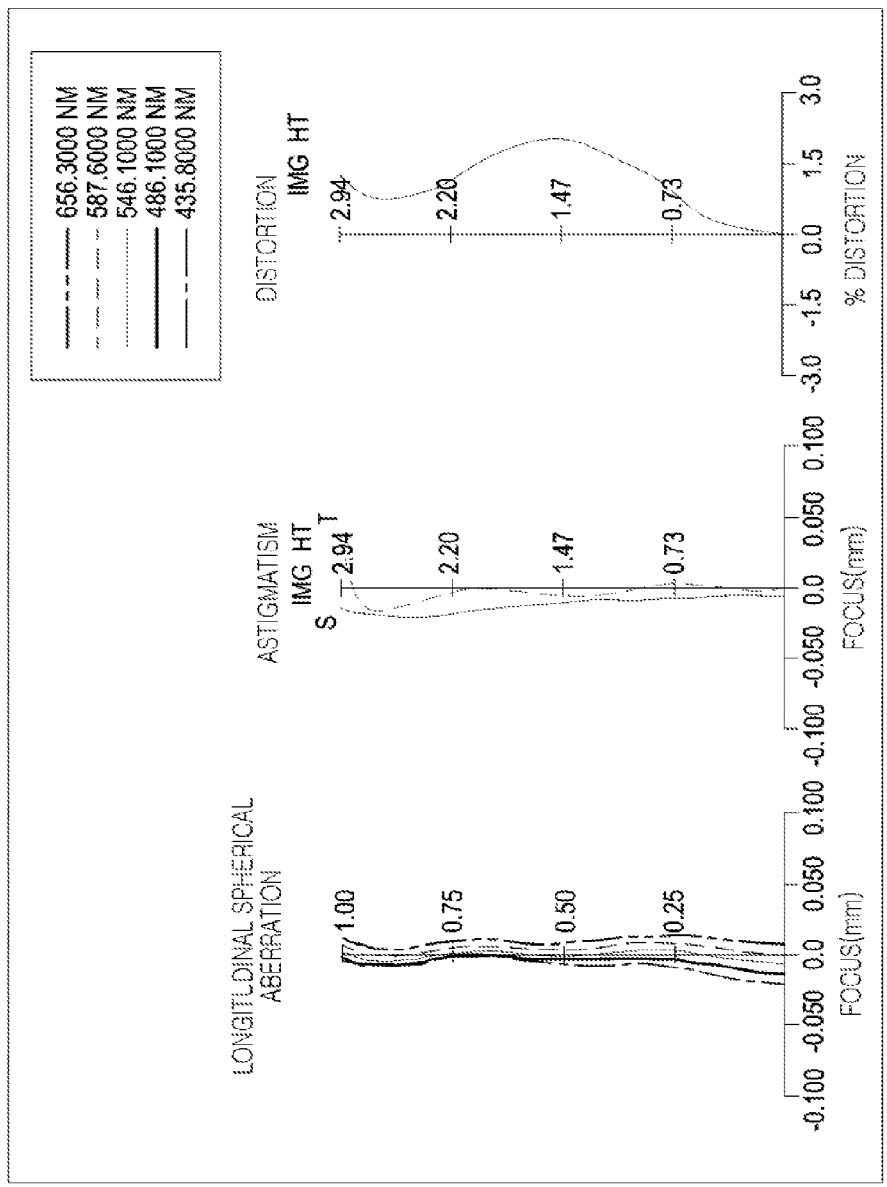
FIGS. 7 and 8 are graphs having curves representing aberration characteristics of the optical system illustrated in FIG. 6.
Figure 8:
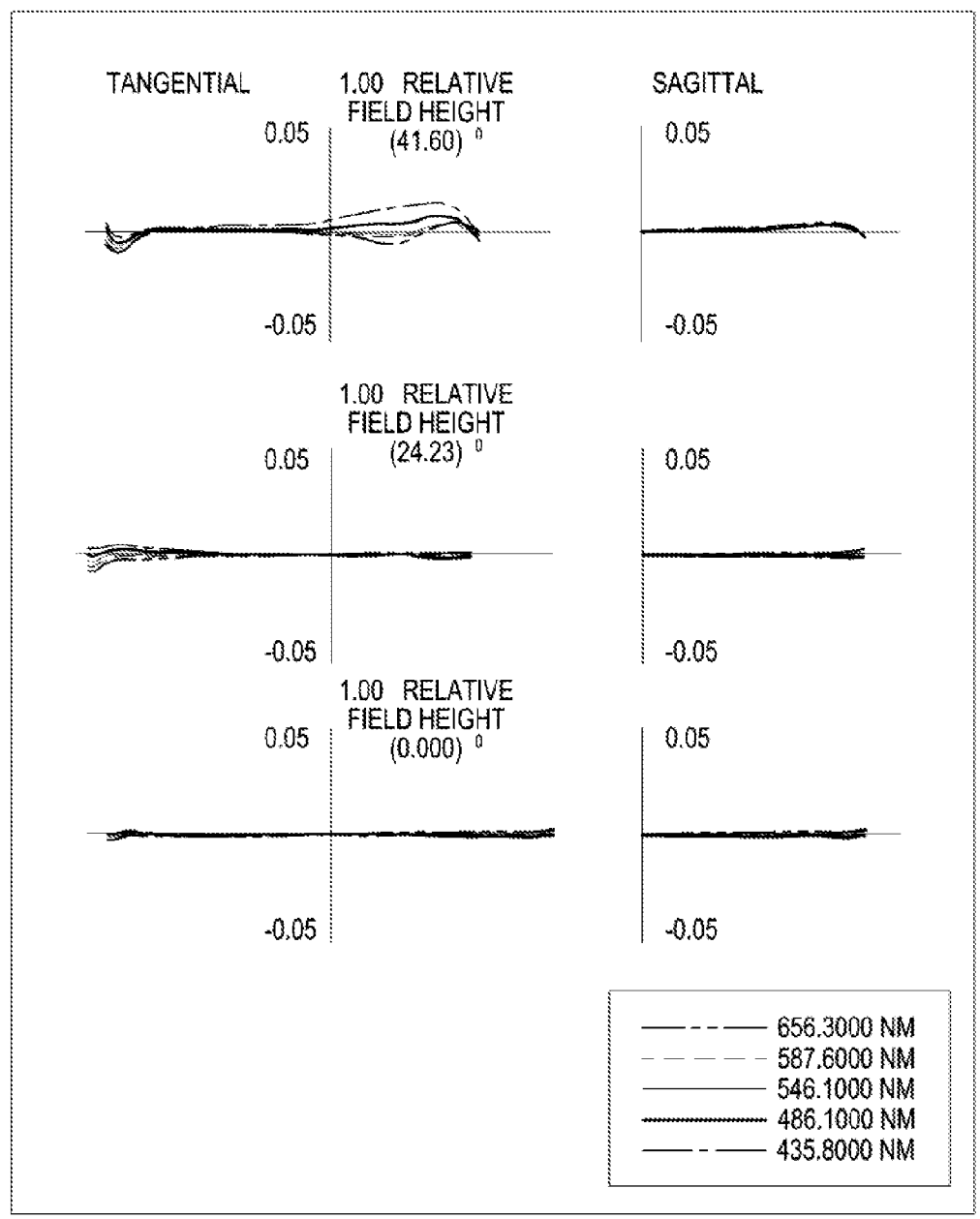
Figure 11:
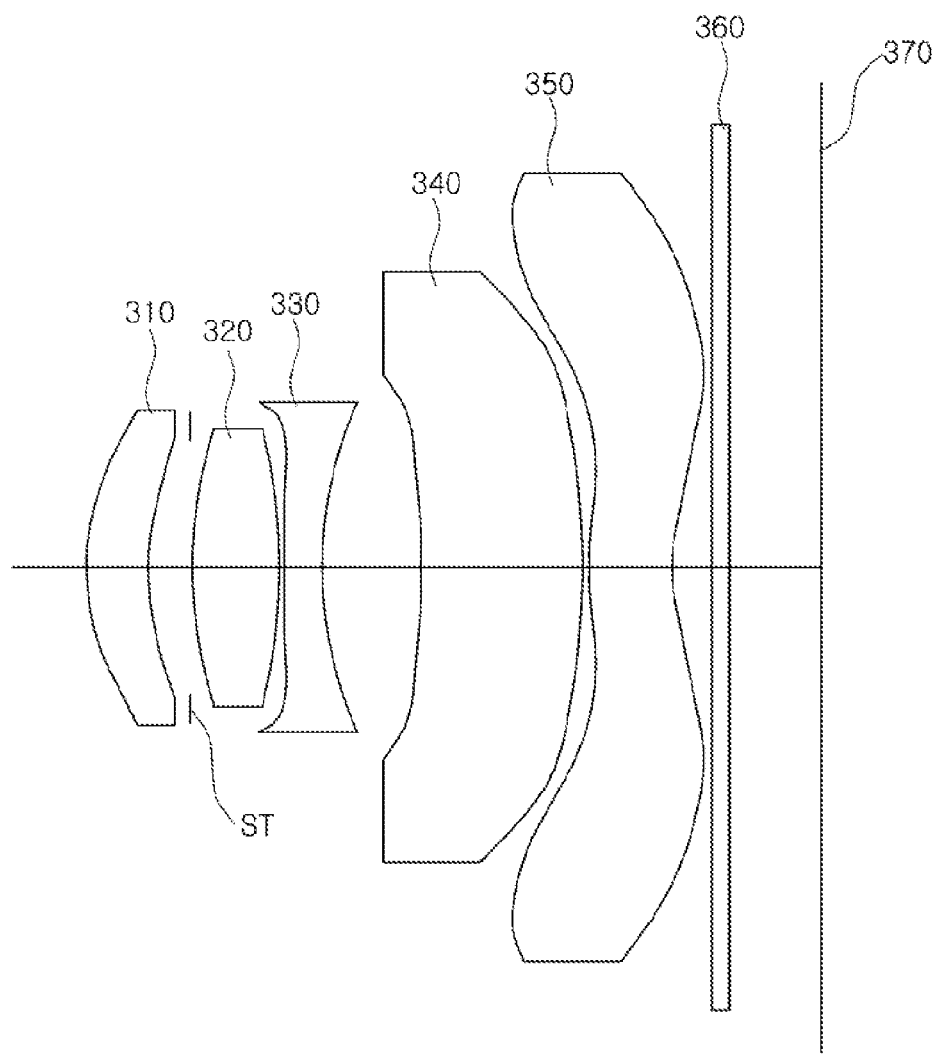
FIG. 11 is a view of an optical system according to a third exemplary embodiment of the present disclosure.

In addition, the optical system configured as described above may have aberration characteristics illustrated in FIGS. 7 and 8.

An optical system according to a third exemplary embodiment of the present disclosure will be described with reference to FIGS. 11 through 15.

The optical system according to the third exemplary embodiment may include a first lens 310, a second lens 320, a third lens 330, a fourth lens 340, and a fifth lens 350, and may further include an infrared cut-off filter 360, an image sensor 370, and a stop ST.

Here, respective characteristics (radii of curvature, thicknesses of lenses or distances between the lenses, refractive indices, Abbe numbers, and effective radii) of lenses are illustrated in FIG. 14.

In the third exemplary embodiment, the first lens 310 may have positive refractive power, and have a meniscus shape of which an object-side surface is convex. The second lens 320 may have positive refractive power and have both surfaces that are convex. The third lens 330 may have negative refractive power and have a meniscus shape of which an object-side surface is convex. The fourth lens 340 may have positive refractive power and have a meniscus shape of which an image-side surface is convex. The fifth lens 350 may have negative refractive power and have a meniscus shape of which an object-side surface is convex. In addition, the fifth lens 350 may have at least one inflection point formed on at least one of first and second surfaces thereof. In addition, the fifth lens 350 may have at least four inflection points in an effective radius thereof. In addition, the stop ST may be disposed between the first lens 310 and the second lens 320.

Meanwhile, respective surfaces of the first to fifth lenses 310 to 350 may have aspherical surface coefficients as illustrated in FIG. 15. That is, all of the first surface of the first lens 310 to the second surface of the fifth lens 350 may be aspherical.

Figure 12:
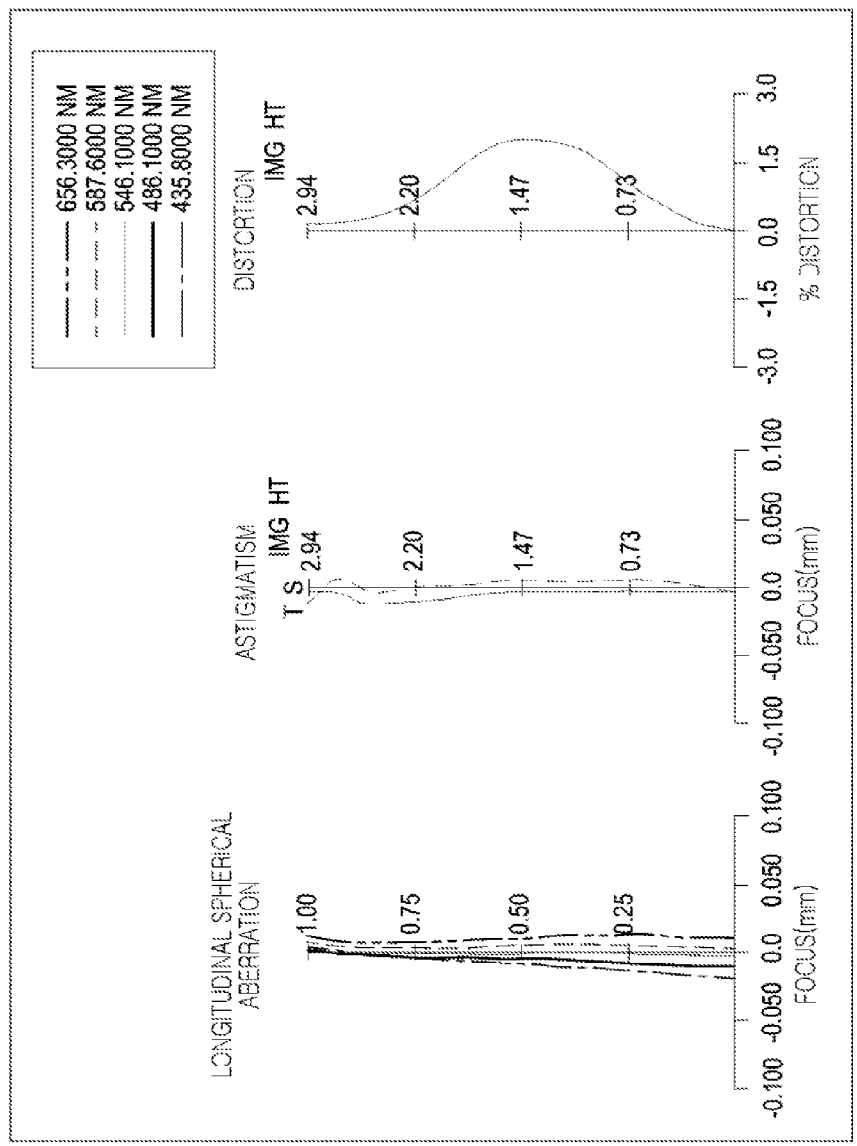
FIGS. 12 and 13 are graphs having curves representing aberration characteristics of the optical system illustrated in FIG. 11.
Figure 13:
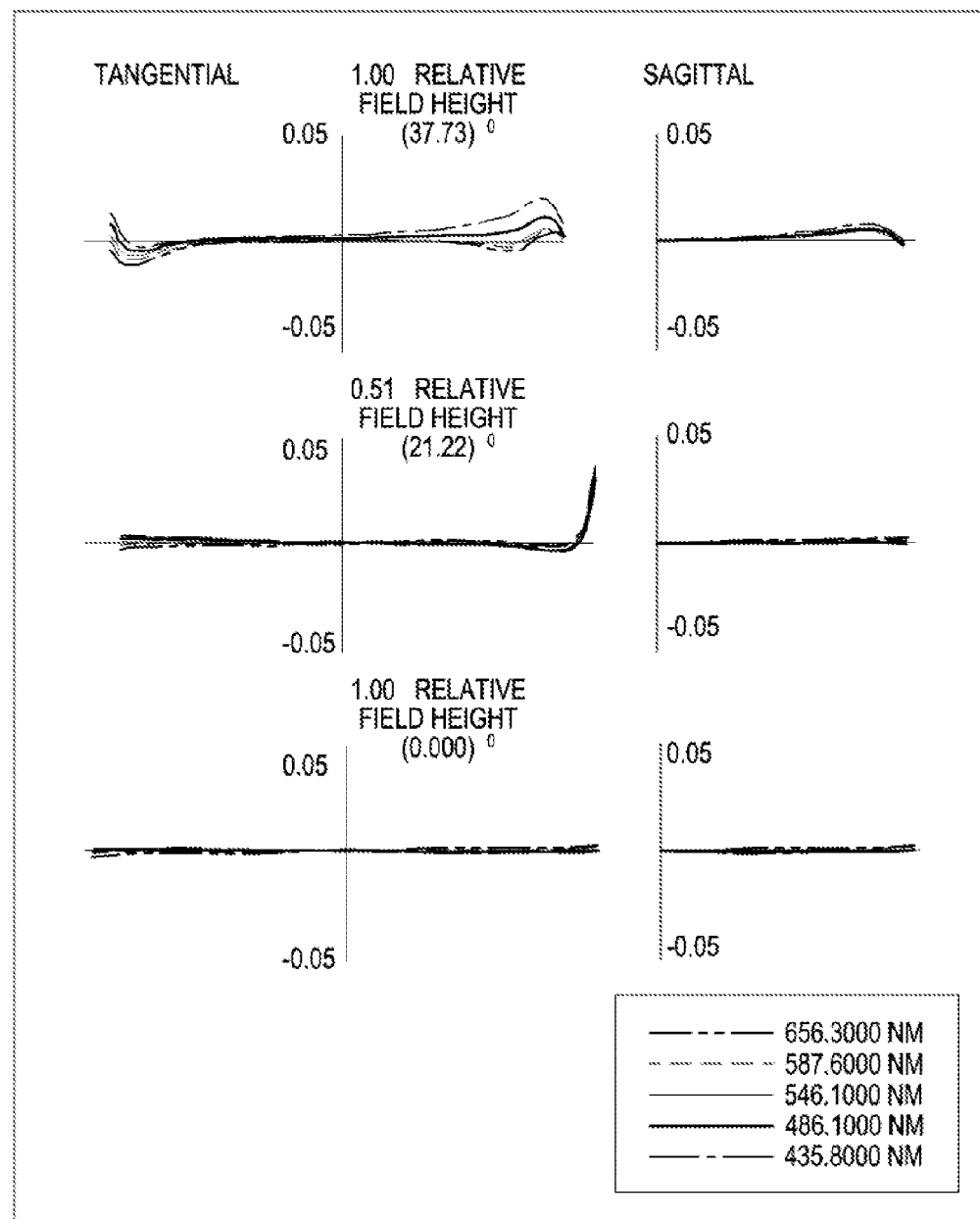
Figure 16:
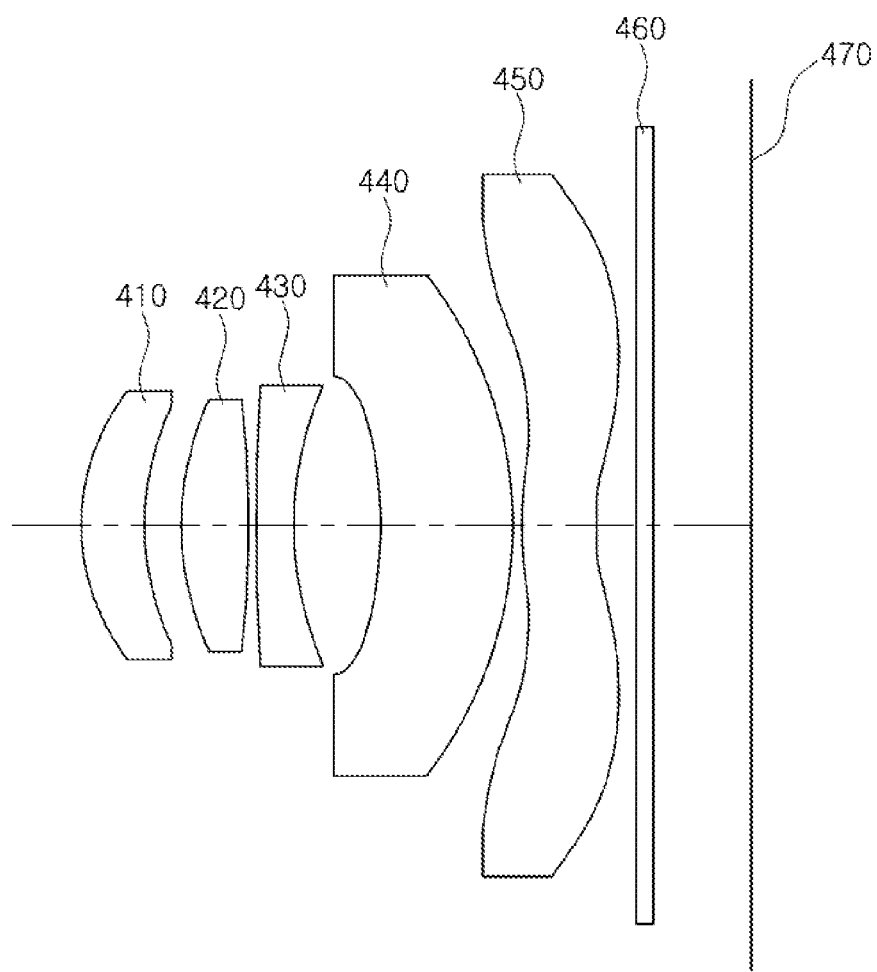
FIG. 16 is a view of an optical system according to a fourth exemplary embodiment of the present disclosure.

In addition, the optical system configured as described above may have aberration characteristics illustrated in FIGS. 12 and 13.

An optical system according to a fourth exemplary embodiment of the present disclosure will be described with reference to FIGS. 16 through 20.

The optical system according to the fourth exemplary embodiment may include a first lens 410, a second lens 420, a third lens 430, a fourth lens 440, and a fifth lens 450, and may further include an infrared cut-off filter 460 and an image sensor 470.

Here, respective characteristics (radii of curvature, thicknesses of lenses or distances between the lenses, refractive indices, Abbe numbers, and effective radii) of lenses are illustrated in FIG. 19.

In the fourth exemplary embodiment, the first lens 410 may have positive refractive power, and have a meniscus shape of which an object-side surface is convex. The second lens 420 may have positive refractive power and have both surfaces that are convex. The third lens 430 may have negative refractive power and have a meniscus shape of which an object-side surface is convex. The fourth lens 440 may have negative refractive power and have a meniscus shape of which an image-side surface is convex. The fifth lens 450 may have negative refractive power and have a meniscus shape of which an object-side surface is convex. In addition, the fifth lens 450 may have at least one inflection point formed on at least one of first and second surfaces thereof. In addition, the fifth lens 450 may have at least four inflection points in an effective radius thereof.

Meanwhile, respective surfaces of the first to fifth lenses 410 to 450 may have aspherical surface coefficients as illustrated in FIG. 20. That is, all of the first surface of the first lens 410 to the second surface of the fifth lens 450 may be aspherical.

Figure 17:
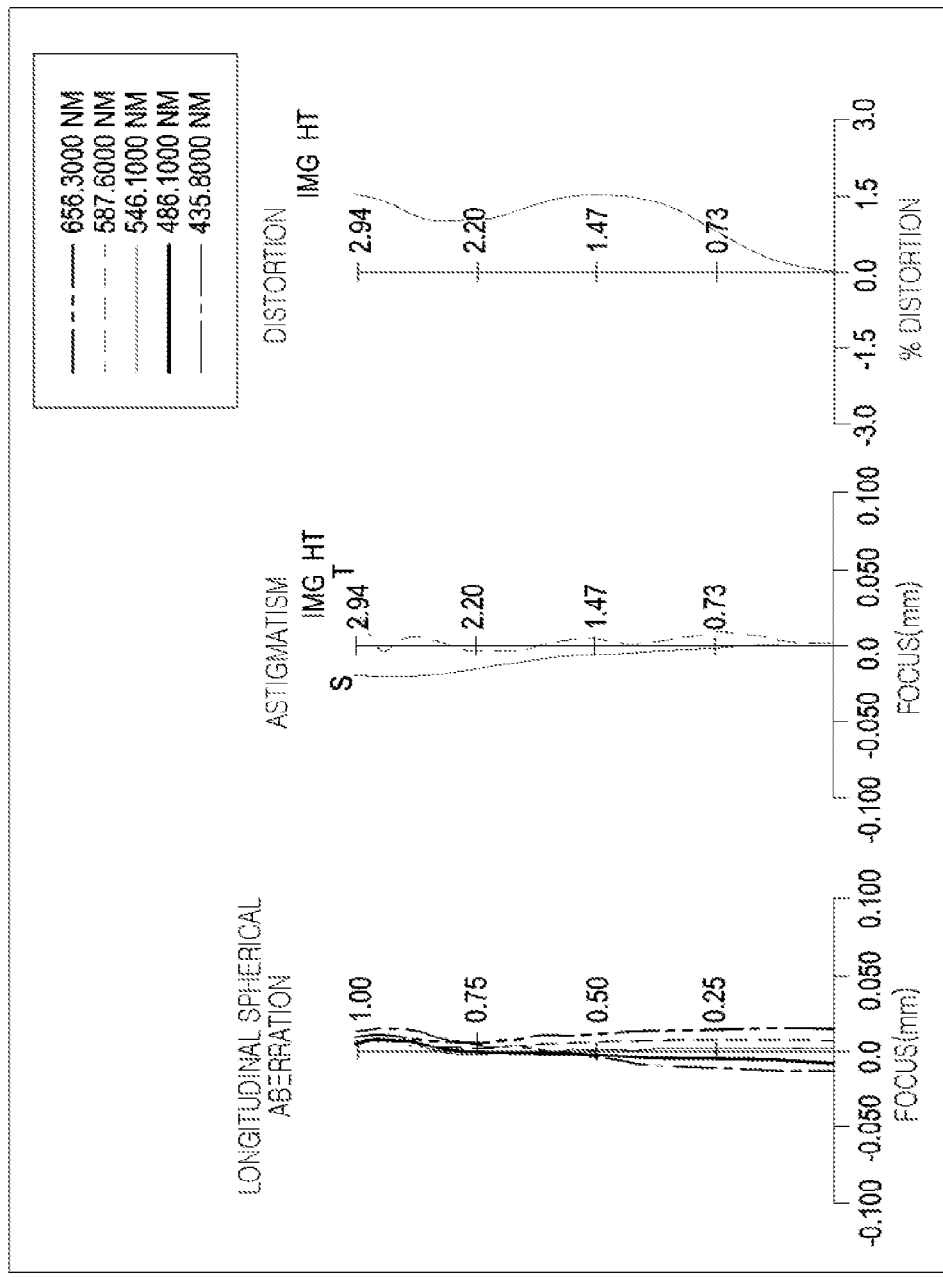
FIGS. 17 and 18 are graphs having curves representing aberration characteristics of the optical system illustrated in FIG. 16.
Figure 18:
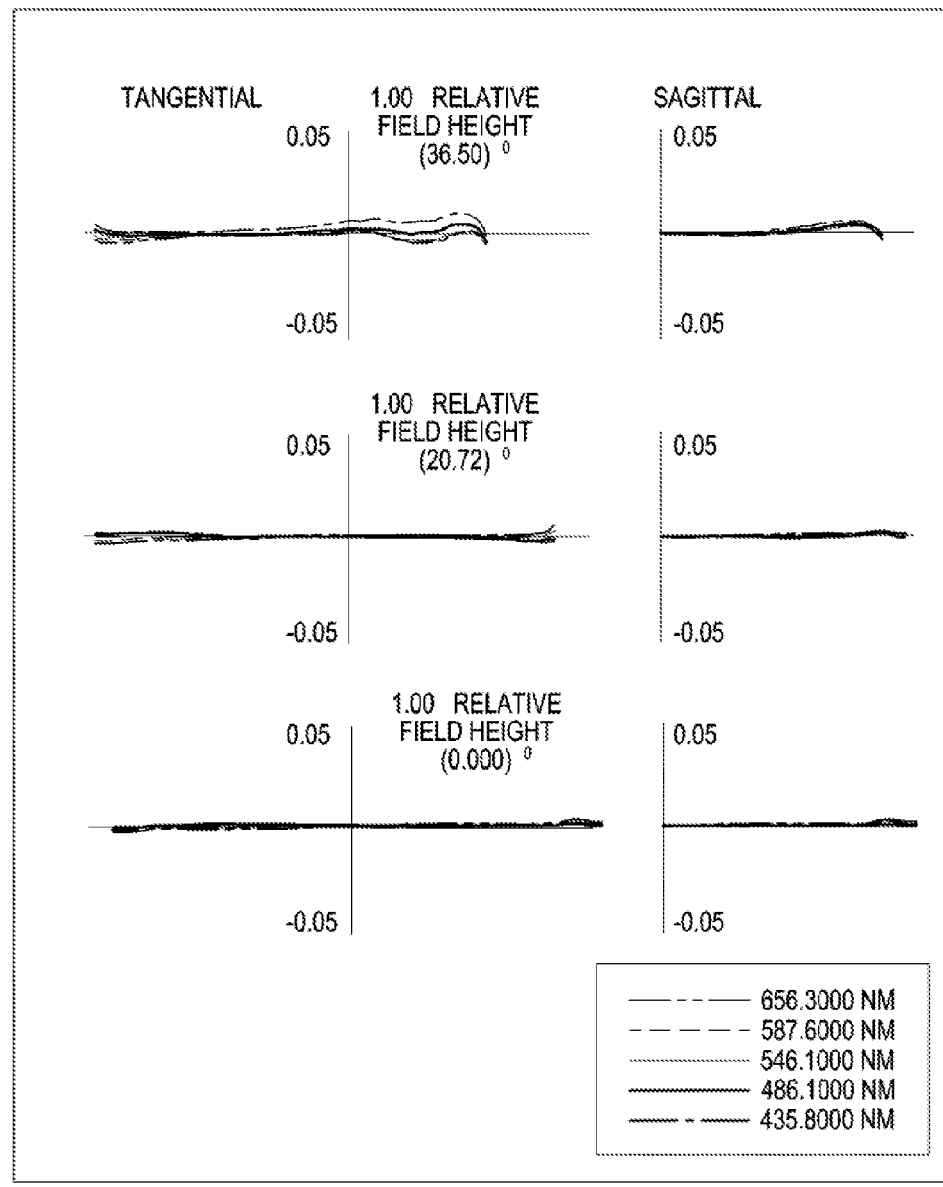
Figure 21:
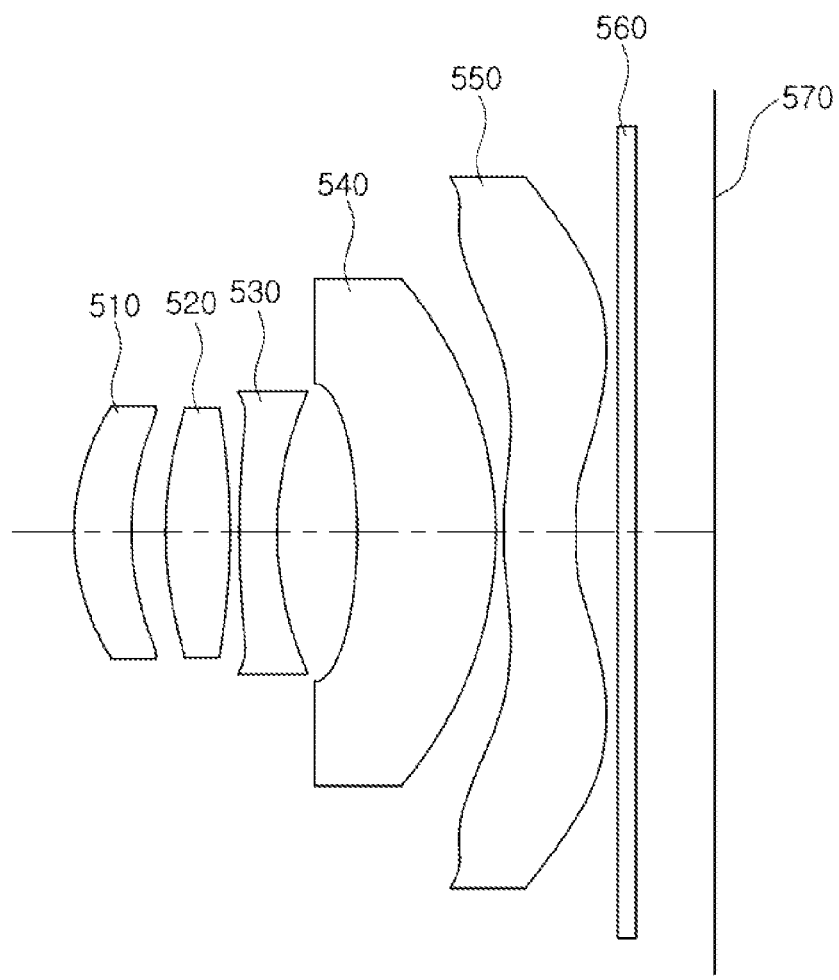
FIG. 21 is a view of an optical system according to a fifth exemplary embodiment of the present disclosure.

In addition, the optical system configured as described above may have aberration characteristics illustrated in FIGS. 17 and 18.

An optical system according to a fifth exemplary embodiment of the present disclosure will be described with reference to FIGS. 21 through 25.

The optical system according to the fifth exemplary embodiment may include a first lens 510, a second lens 520, a third lens 530, a fourth lens 540, and a fifth lens 550, and may further include an infrared cut-off filter 560 and an image sensor 570.

Here, respective characteristics (radii of curvature, thicknesses of lenses or distances between the lenses, refractive indices, Abbe numbers, and effective radii) of lenses are illustrated in FIG. 24.

In the fifth exemplary embodiment, the first lens 510 may have positive refractive power, and have a meniscus shape of which an object-side surface is convex. The second lens 520 may have positive refractive power and have both surfaces that are convex. The third lens 530 may have negative refractive power and have a meniscus shape of which an object-side surface is convex. The fourth lens 540 may have negative refractive power and have a meniscus shape of which an image-side surface is convex. The fifth lens 550 may have negative refractive power and have a meniscus shape of which an object-side surface is convex. In addition, the fifth lens 550 may have at least one inflection point formed on at least one of first and second surfaces thereof. In addition, the fifth lens 550 may have at least four inflection points in an effective radius thereof.

Meanwhile, respective surfaces of the first to fifth lenses 510 to 550 may have aspherical surface coefficients as illustrated in FIG. 25. That is, all of the first surface of the first lens 510 to the second surface of the fifth lens 550 may be aspherical.

Figure 22:
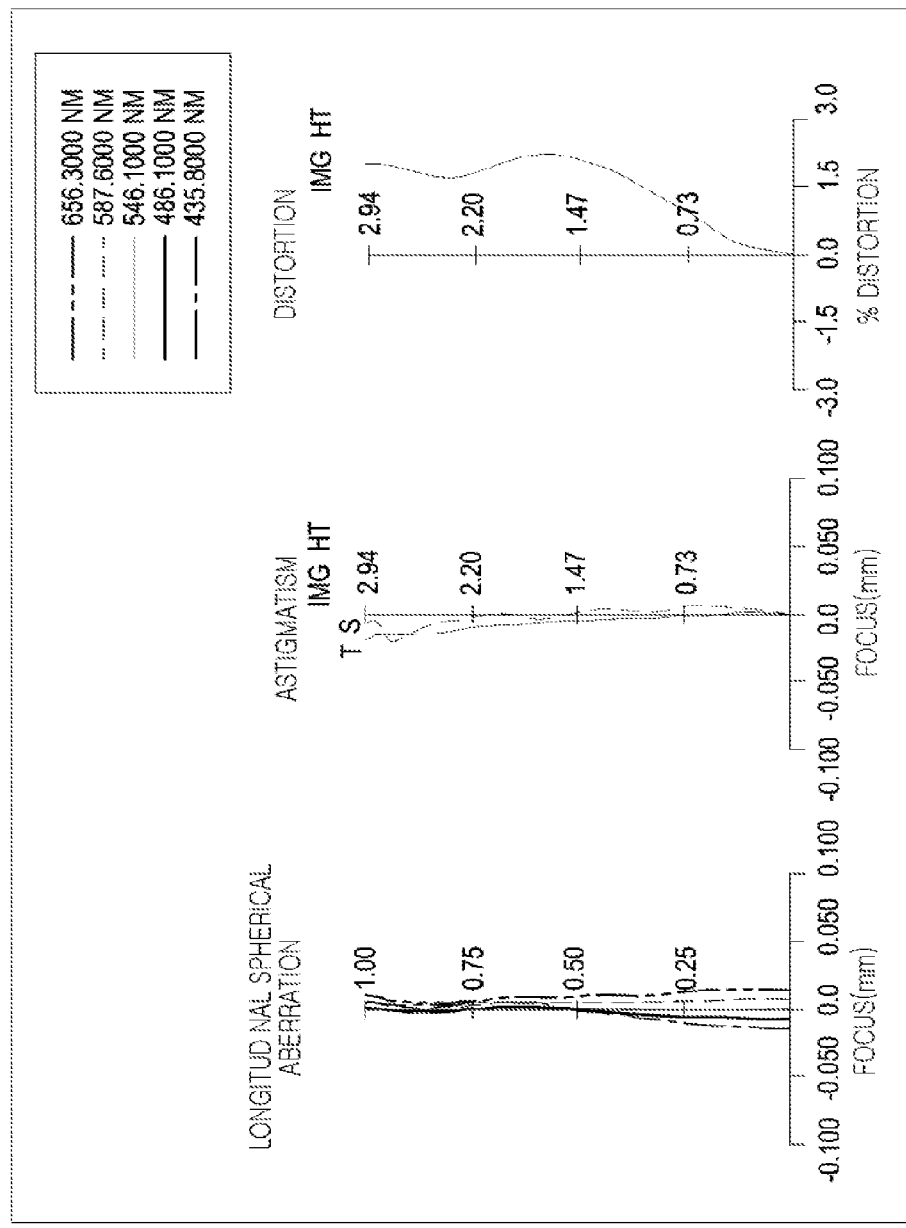
FIGS. 22 and 23 are graphs having curves representing aberration characteristics of the optical system illustrated in FIG. 21.
Figure 23:
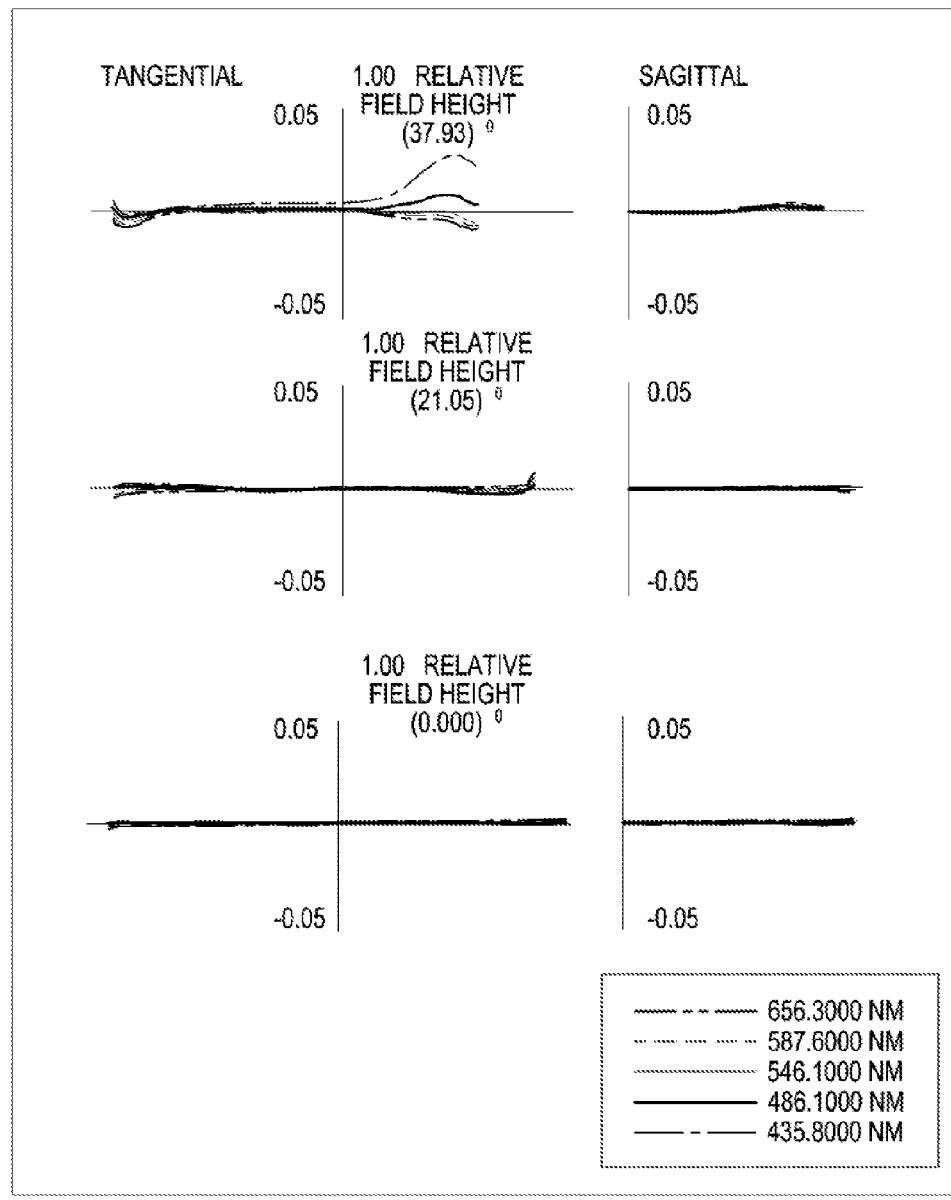

In addition, the optical system configured as described above may have aberration characteristics illustrated in FIGS. 22 and 23.

Meanwhile, it may be appreciated from Table 1 that the optical systems according to the first to fifth exemplary embodiments of the present disclosure satisfy Conditional Expressions 1 to 11 described above. Therefore, optical performance of the lens may be improved.

TABLE 1

|  | First Exemplary Embodiment | Second Exemplary Embodiment | Third Exemplary Embodiment | Fourth Exemplary Embodiment | Fifth Exemplary Embodiment |
| --- | --- | --- | --- | --- | --- |
| EFL | 3.63 | 3.26 | 3.78 | 3.91 | 3.82 |
| FNO | 2.31 | 2.28 | 2.26 | 2.26 | 2.26 |
| ANG | 77.33 | 83.2 | 75.45 | 74.8 | 74.01 |
| EPD | 1.57 | 1.43 | 1.67 | 1.73 | 1.69 |
| TTL | 4.2 | 3.95 | 4.42 | 4.42 | 4.03 |
| SL | 3.94 | 3.77 | 3.79 | 4.12 | 3.77 |
| ImgH | 5.87 | 5.87 | 5.87 | 5.87 | 5.87 |
| TTL/Imgh | 0.72 | 0.67 | 0.75 | 0.75 | 0.69 |
| Ang/Fno | 33.48 | 36.45 | 33.34 | 33.07 | 32.69 |
| (Ang*ImgH)/(Fno*TTL) | 46.77 | 54.16 | 44.26 | 43.91 | 47.64 |
| R1 | 1.23 | 1.28 | 1.37 | 1.3 | 1.36 |
| R2 | 1.48 | 1.63 | 1.79 | 1.63 | 1.67 |
| R3 | 1.84 | 2.87 | 2.22 | 1.82 | 2.06 |
| R1/EFL | 0.34 | 0.39 | 0.36 | 0.33 | 0.36 |
| R2/EFL | 0.41 | 0.5 | 0.47 | 0.42 | 0.44 |
| R3/EFL | 0.51 | 0.88 | 0.59 | 0.47 | 0.54 |

As set forth above, in the optical system according to exemplary embodiments of the present disclosures, an aberration improvement effect may be increased, high levels of resolution may be realized, and sensitivity of lenses to assembling tolerances may be improved.

While exemplary embodiments have been shown and described above, it will be apparent to those skilled in the art that modifications and variations could be made without departing from the scope of the present invention as defined by the appended claims.

What is claimed is:

1. An optical system comprising:
a first lens having positive refractive power;
a second lens having positive refractive power;
a third lens having negative refractive power and having a convex object-side surface;
a fourth lens having negative refractive power; and
a fifth lens having negative refractive power,
wherein the first to fifth lenses are sequentially disposed from an object side,
wherein the optical system has a total of five lenses,
wherein the second lens among the first to fifth lenses has the highest refractive power, and
wherein $0.47 \leq R3/EFL \leq 0.88$, where R3 is a radius of curvature of an object-side surface of the second lens, and EFL is an overall focal length of the optical system.

2. The optical system of claim 1, further comprising an image sensor converting an image of a subject incident thereon through the first to fifth lenses into an electrical signal,
wherein Conditional Expression 1 is satisfied:

$$43 < (ANG*ImgH)/(Fno*TTL) < 55 \quad \text{[Conditional Expression 1]}$$

where ANG is a field of view of the optical system,
ImgH is a diagonal length of an imaging surface of the image sensor,
Fno is a constant indicating brightness of the optical system, and
TTL is a distance from an object-side surface of the first lens to the imaging surface of the image sensor.

3. The optical system of claim 1, wherein Conditional Expression 2 is satisfied:

$$0.33 < R1/EFL \leq 0.39 \quad \text{[Conditional Expression 2]}$$

where R1 is a radius of curvature of an object-side surface of the first lens, and EFL is an overall focal length of the optical system.

4. The optical system of claim 1, wherein Conditional Expression 3 is satisfied:

$$0.42 \leq R2/EFL < 0.50 \quad \text{[Conditional Expression 3]}$$

where R2 is a radius of curvature of an image-side surface of the first lens, and EFL is an overall focal length of the optical system.

5. The optical system of claim 1, further comprising an image sensor converting an image of a subject incident thereon through the first to fifth lenses into an electrical signal,
wherein Conditional Expression 5 is satisfied:

$$0.65 < TTL/ImgH \leq 0.75 \quad \text{[Conditional Expression 5]}$$

where TTL is a distance from an object-side surface of the first lens to an imaging surface of the image sensor, and
ImgH is a diagonal length of the imaging surface of the image sensor.

6. The optical system of claim 1, wherein Conditional Expression 6 is satisfied:

$$Fno \leq 2.4 \quad \text{[Conditional Expression 6]}$$

where Fno is a constant indicating brightness of the optical system.

7. The optical system of claim 1, wherein Conditional Expression 7 is satisfied:

$$Fno \leq 2.3 \quad \text{[Conditional Expression 7]}$$

where Fno is a constant indicating brightness of the optical system.

8. The optical system of claim 1, wherein Conditional Expression 8 is satisfied:

$$ANG/Fno \geq 32 \quad \text{[Conditional Expression 8]}$$

where ANG is a field of view of the optical system, and Fno is a constant indicating brightness of the optical system.

9. The optical system of claim 1, wherein Conditional Expression 9 is satisfied:

$$v4 < 24 \quad \text{[Conditional Expression 9]}$$

where $v4$ is an Abbe number of the fourth lens.

10. The optical system of claim 1, wherein Conditional Expression 10 is satisfied:

$$ANG > 74° \quad \text{[Conditional Expression 10]}$$

where ANG is a field of view of the optical system.

11. The optical system of claim 1, wherein Conditional Expression 11 is satisfied:

$$ANG > 74.5° \quad \text{[Conditional Expression 11]}$$

where ANG is a field of view of the optical system.

12. The optical system of claim 1, wherein the first lens has a meniscus shape of which an object-side surface is convex.

13. The optical system of claim 1, wherein both surfaces of the second lens are convex.

14. The optical system of claim 1, wherein the third lens has a meniscus shape of which the object-side surface is convex.

15. The optical system of claim 1, wherein the fourth lens has a meniscus shape of which an image-side surface is convex.

16. The optical system of claim 1, wherein the fifth lens has a meniscus shape of which an object-side surface is convex.

17. The optical system of claim 1, wherein the fifth lens has at least one inflection point on at least one of an object-side surface and an image-side surface thereof.

18. The optical system of claim 1, further comprising a stop disposed between the first and second lenses.

19. The optical system of claim 1, wherein the first to fifth lenses are plastic lenses.

20. The optical system of claim 1, wherein all of respective surfaces of the first to fifth lenses are aspherical.

21. An optical system comprising:
a first lens having positive refractive power;
a second lens having positive refractive power;
a third lens having negative refractive power;
a fourth lens having negative refractive power;
a fifth lens having negative refractive power and having at least four inflection points within an effective radius thereof; and
an image sensor converting an image of a subject incident thereon through the first to fifth lenses into an electrical signal,
wherein the first to fifth lenses and the image sensor are sequentially disposed from an object side, wherein the optical system has a total of five lenses, and Conditional Expression 1 is satisfied:

$$43<(ANG*ImgH)/(Fno*TTL)<55 \quad \text{[Conditional Expression 1]}$$

where ANG is a field of view of the optical system,
ImgH is a diagonal length of an imaging surface of the image sensor,
Fno is a constant indicating brightness of the optical system, and
TTL is a distance from an object-side surface of the first lens to the imaging surface of the image sensor.

22. The optical system of claim 21, wherein Conditional Expression 2 is satisfied:

$$0.33<R1/EFL\leq0.39 \quad \text{[Conditional Expression 2]}$$

where R1 is a radius of curvature of the object-side surface of the first lens, and
EFL is an overall focal length of the optical system.

23. The optical system of claim 21, wherein Conditional Expression 3 is satisfied:

$$0.42\leq R2/EFL<0.50 \quad \text{[Conditional Expression 3]}$$

where R2 is a radius of curvature of an image-side surface of the first lens, and
EFL is an overall focal length of the optical system.

24. The optical system of claim 21, wherein Conditional Expression 4 is satisfied:

$$0.47\leq R3/EFL\leq0.88 \quad \text{[Conditional Expression 4]}$$

where R3 is a radius of curvature of an object-side surface of the second lens, and
EFL is an overall focal length of the optical system.

25. The optical system of claim 21, wherein Conditional Expression 5 is satisfied:

$$0.65<TTL/ImgH\leq0.75 \quad \text{[Conditional Expression 5]}.$$

26. The optical system of claim 21, wherein Conditional Expression 6 is satisfied:

$$Fno\leq2.4 \quad \text{[Conditional Expression 6]}.$$

27. The optical system of claim 21, wherein Conditional Expression 7 is satisfied:

$$Fno\leq2.3 \quad \text{[Conditional Expression 7]}.$$

28. The optical system of claim 21, wherein Conditional Expression 8 is satisfied:

$$ANG/Fno\geq32 \quad \text{[Conditional Expression 8]}.$$

29. The optical system of claim 21, wherein Conditional Expression 9 is satisfied:

$$v4<24 \quad \text{[Conditional Expression 9]}$$

where v4 is an Abbe number of the fourth lens.

30. The optical system of claim 21, wherein Conditional Expression 10 is satisfied:

$$ANG>74° \quad \text{[Conditional Expression 10]}.$$

31. The optical system of claim 21, wherein Conditional Expression 11 is satisfied:

$$ANG>74.5° \quad \text{[Conditional Expression 11]}.$$

32. The optical system of claim 21, wherein the first lens has a meniscus shape of which the object-side surface is convex.

33. The optical system of claim 21, wherein both surfaces of the second lens are convex.

34. The optical system of claim 21, wherein the third lens has a meniscus shape of which an object-side surface is convex.

35. The optical system of claim 21, wherein the fourth lens has a meniscus shape of which an image-side surface is convex.

36. The optical system of claim 21, wherein the fifth lens has a meniscus shape of which an object-side surface is convex.

* * * * *